(12) United States Patent
Hermann

(10) Patent No.: US 7,939,192 B2
(45) Date of Patent: May 10, 2011

(54) EARLY DETECTION OF BATTERY CELL THERMAL EVENT

(75) Inventor: Weston A. Hermann, Palo Alto, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 993 days.

(21) Appl. No.: 11/820,660

(22) Filed: Jun. 20, 2007

(65) Prior Publication Data

US 2008/0315839 A1    Dec. 25, 2008

(51) Int. Cl.
*H01M 2/00* (2006.01)

(52) U.S. Cl. ............... 429/61; 429/50; 429/58; 429/59; 429/62; 429/112

(58) Field of Classification Search ............. 429/50, 429/58, 59, 61, 62, 112
See application file for complete search history.

(56) References Cited

U.S. PATENT DOCUMENTS

| | | | |
|---|---|---|---|
| 4,533,243 A | 8/1985 | Zhukov et al. | |
| 5,059,460 A | 10/1991 | Heyes et al. | |
| 6,630,991 B2 | 10/2003 | Kitamura et al. | |
| 6,705,101 B2 | 3/2004 | Brotz et al. | |
| 6,885,298 B2 | 4/2005 | Everson et al. | |
| 7,140,765 B2 | 11/2006 | Memoli et al. | |
| 2002/0149346 A1* | 10/2002 | Sakakibara | 320/162 |
| 2004/0137313 A1* | 7/2004 | Jaura et al. | 429/62 |
| 2005/0023267 A1* | 2/2005 | Timans et al. | 219/405 |

* cited by examiner

*Primary Examiner* — Patrick Ryan
*Assistant Examiner* — Ben Lewis
(74) *Attorney, Agent, or Firm* — Patent Law Office of David G. Beck

(57) ABSTRACT

A battery module for use in an electric vehicle is disclosed. The battery module includes a plurality of cells arranged in a predetermined pattern within the module. The battery module also includes an optical pyrometer arranged inside the module. The optical pyrometer is installed within the module after being tuned to detect a predetermined frequency or band of frequencies. The pyrometer will be used to detect an increase in short wave radiation density from one of the battery cells within the module wherein that battery cell has a temperature above a predetermined threshold. The optical pyrometer will be used to communicate an electric signal to a control system of the electric vehicle wherein that control system will implement a predetermined mitigation process to contain the thermal event of that one cell within the battery module.

13 Claims, 4 Drawing Sheets

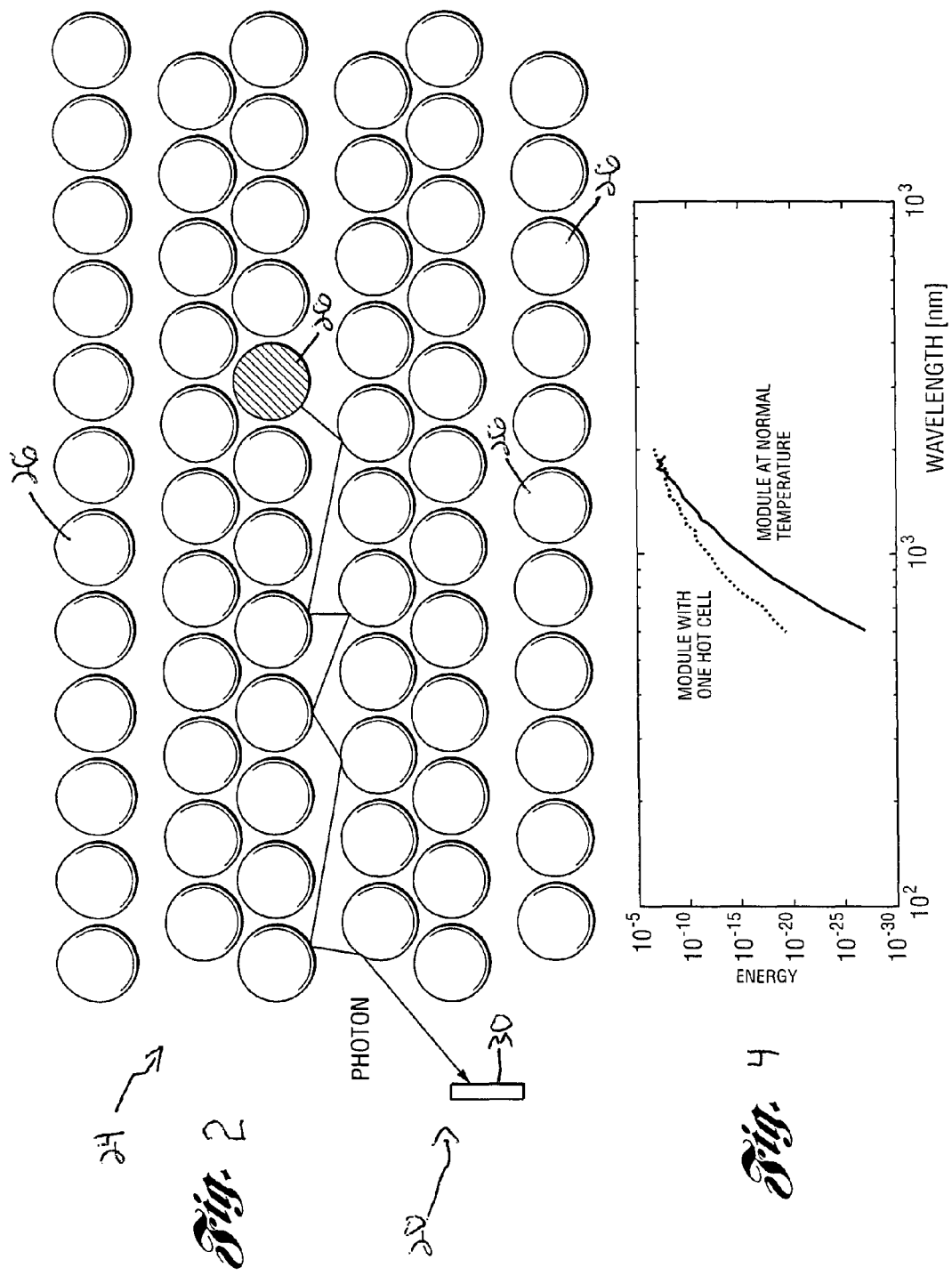

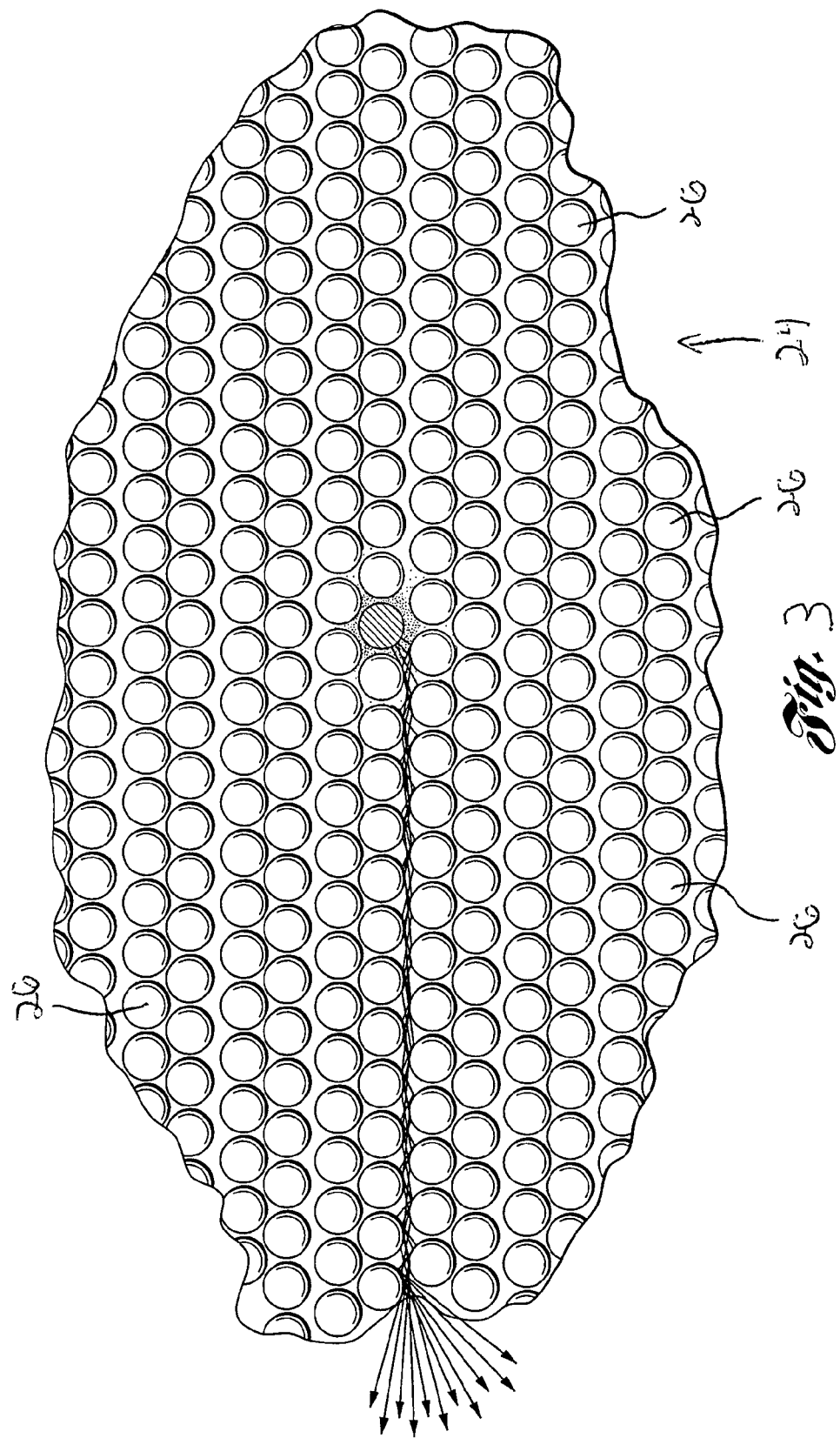

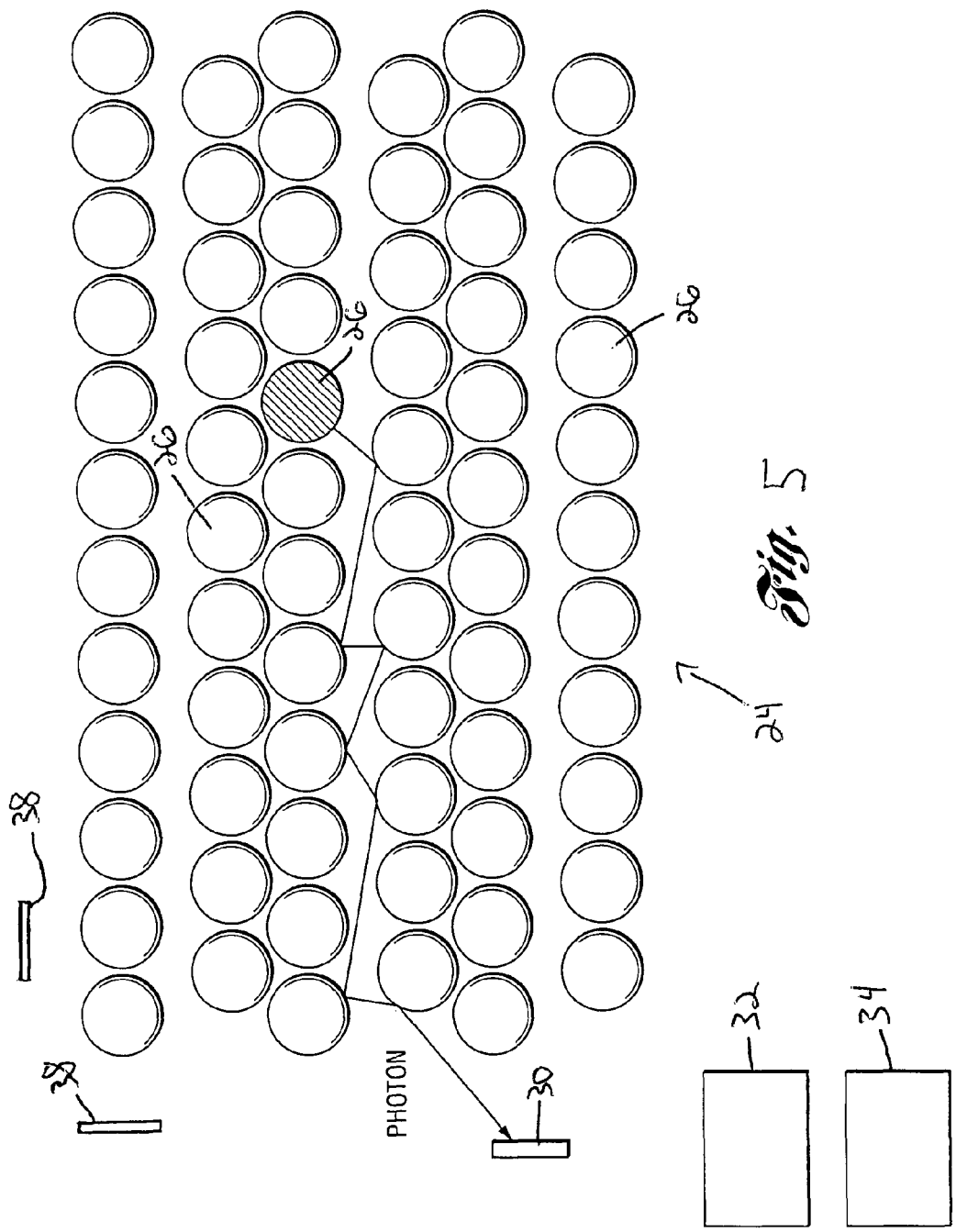

EARLY DETECTION OF BATTERY CELL THERMAL EVENT

BACKGROUND OF THE INVENTION

1. Field of the Invention

The subject invention generally relates to detection of a thermal event and more particularly relates to early detection of a battery cell thermal event within a battery module for use in an electric vehicle.

2. Description of Related Art

It is well known in the prior art to use electric automobiles to provide transportation for occupants. Many of these prior art electric automobiles carry several thousand pounds of nickel metal hydride batteries to achieve a long range electric vehicle for every day use by consumers. Furthermore, many of these prior art electric vehicles need to be physically large and heavy to accommodate all of these batteries, such that these cars are not capable of achieving necessary acceleration, handling, performance and an extended range needed for an electric car to become a feasible option for public purchase and use. Many prior art electrical vehicles are of normal size and not overly heavy in a very small range, thus reducing feasibility for large mass selling of such vehicles to the consuming public. Furthermore, many of these prior art electric vehicles which use such batteries had problems with protecting the occupants in the vehicle from the high voltage components and high temperatures that emanate from such high voltage components and still provide a vehicle that travels at acceptable speeds comparable to that of a gasoline or diesel internal combustion engine. Many of these prior art electrical vehicles have had problems with the prior art batteries overheating, thus reducing the range of the electric vehicle, the durability and overall life of the batteries or cells that are part of the battery pack systems within the electric vehicle.

Generally, the battery or cells arranged within many prior art vehicles operate with high power output which increases the temperature and hence, may reduce the longevity of these prior art batteries. The use of the heavy and high voltage batteries systems of the prior art electric cars required a lot of maintenance to keep the batteries operating due to the high temperatures at which the battery pack systems operated. Some of these prior art systems tried to maximize longevity of the batteries by using air cooled systems that would blow cold air over the batteries and remove unnecessary heat from the battery compartment. Some other systems use other cooling techniques to try and keep a consistent temperature for the battery cells and overall battery pack within these prior art systems. Generally, in many of these prior art vehicles if one cell of the battery overheats, such overheating of one cell may propagate to surroundings cells thus creating a thermal runaway event for the battery pack of the electric vehicle. However, some of these prior art systems were able to detect the overheating of individual cells within the battery pack after a combustion event occurs and then initiate mitigation of such thermal runaway events. Therefore, the earlier the detection of a thermal event of an individual cell within a battery module, the more effective the mitigation process would be to prevent an all out thermal runaway event for the battery module.

Therefore, there is a need in the art for an improved early detection process for a battery cell having a thermal event within a battery module. There also is a need in the art for an improved apparatus for detecting thermal events at an earlier time than prior art systems. There also is a need in the art for an early detection thermal event system that uses an optical pyrometer to determine if a battery cell has a temperature greater than a predetermined threshold. There also is a need in the art for an early detection system that will increase the maximum longevity, efficiency and power that can be extracted from the battery cells within a battery module thus increasing the range of an electric vehicle for the consumer. There also is a need in the art for a thermal event early detection system that will allow for early intervention via mitigation processes such as full active cooling of a battery module or decreasing the power demand from the surrounding cells of a runaway cell.

SUMMARY OF THE INVENTION

One object of the present invention may be to provide an improved early detection system for a battery cell thermal event.

Another object of the present invention may be to provide an early detection system for use in an electric vehicle.

Another object of the present invention may be to provide a thermal event early detection system that uses an optical pyrometer arranged within a battery module.

Still another object of the present invention may be to provide a thermal event early detection system that uses reflective surfaces arranged at predetermined positions within a battery module.

Yet another object of the present invention may be to provide a thermal event detection system using a plurality of optical pyrometers arranged therein.

Still another object of the present invention may be to provide a thermal event early detection system that is capable of detecting one battery cell with a high temperature wherein self heating is beginning and mitigating such high temperature before all stored energy is released as heat from the cell.

Still another object of the present invention may be to provide a thermal event early detection system that is capable of having an optical pyrometer tuned to a single frequency or a narrow band of frequencies wherein such frequency sensitivity is selected for each predetermined battery module and associated cells.

Still another object of the present invention may be to use an electronic signal from the pyrometer to monitor the radiation energy density over a chosen range of frequencies via a control system and then initiating mitigation measures to stop the propagation of thermal runaway within the entire battery module.

To achieve the foregoing objects a battery module for use in an electric vehicle having a plurality of cells arranged in a predetermined pattern within the module is disclosed. The battery module further includes an optical pyrometer arranged inside the module for detecting thermal runaway of one of the cells to ensure mitigation processes may prevent the entire battery module from entering thermal runaway and propagating therefrom.

One advantage of the present invention may be that it provides a novel and improved thermal event early detection system.

Still a further advantage of the present invention may be that it provides a thermal event early detection system for use in an electric vehicle.

Yet another advantage of the present invention may be that it provides for use of an optical pyrometer within a battery module for early detection of a thermal event in a single battery cell.

Still another advantage of the present invention may be that it provides for use of a reflective surface within a battery module to decrease the absorption and transmission of infrared radiation at and through the outer walls of the module.

Still another advantage of the present invention is that it may provide for the use of reflective surfaces to direct the flow of infrared radiation within the module.

Still another advantage of the present invention may be that each cell within the module may be seen by the pyrometer detector by a small number of reflections off of the predetermined reflective services, thus greatly reducing the required sensitivity of the optical pyrometer detector therein.

Yet another advantage of the present invention may be that it provides for battery cell packaging within the module that reflects nearly 95% of the photons at infrared wave lengths, thus having a radiation spectrum at any point within the battery module that represents components from every cell in the module.

Still another advantage of the present invention may be that it provides for detecting if one cell becomes much hotter than the rest of the cells via the magnitude and wave length of the energy changing such that differences in the spectral energy density due to this one detectable thermal event is detectable anywhere within the battery module.

Other objects, features and advantages of the present invention will become apparent from the subsequent description and the appended claims, taken in conjunction with the accompanying drawings.

BRIEF DESCRIPTION OF THE DRAWINGS

FIG. 2 shows a battery module or sheet having an electrical pyrometer therein according to the present invention.

FIG. 3 shows a view of a battery module in infrared showing the infrared photons from one hot cell reflecting throughout the module.

FIG. 4 shows a radiation energy density diagram within a battery module for normal and hot cell conditions.

FIG. 5 shows a battery module according to the present invention having an optical pyrometer arranged therein and at least one reflective surface arranged therein.

BRIEF DESCRIPTION OF THE EMBODIMENT(S)

Figure 1:
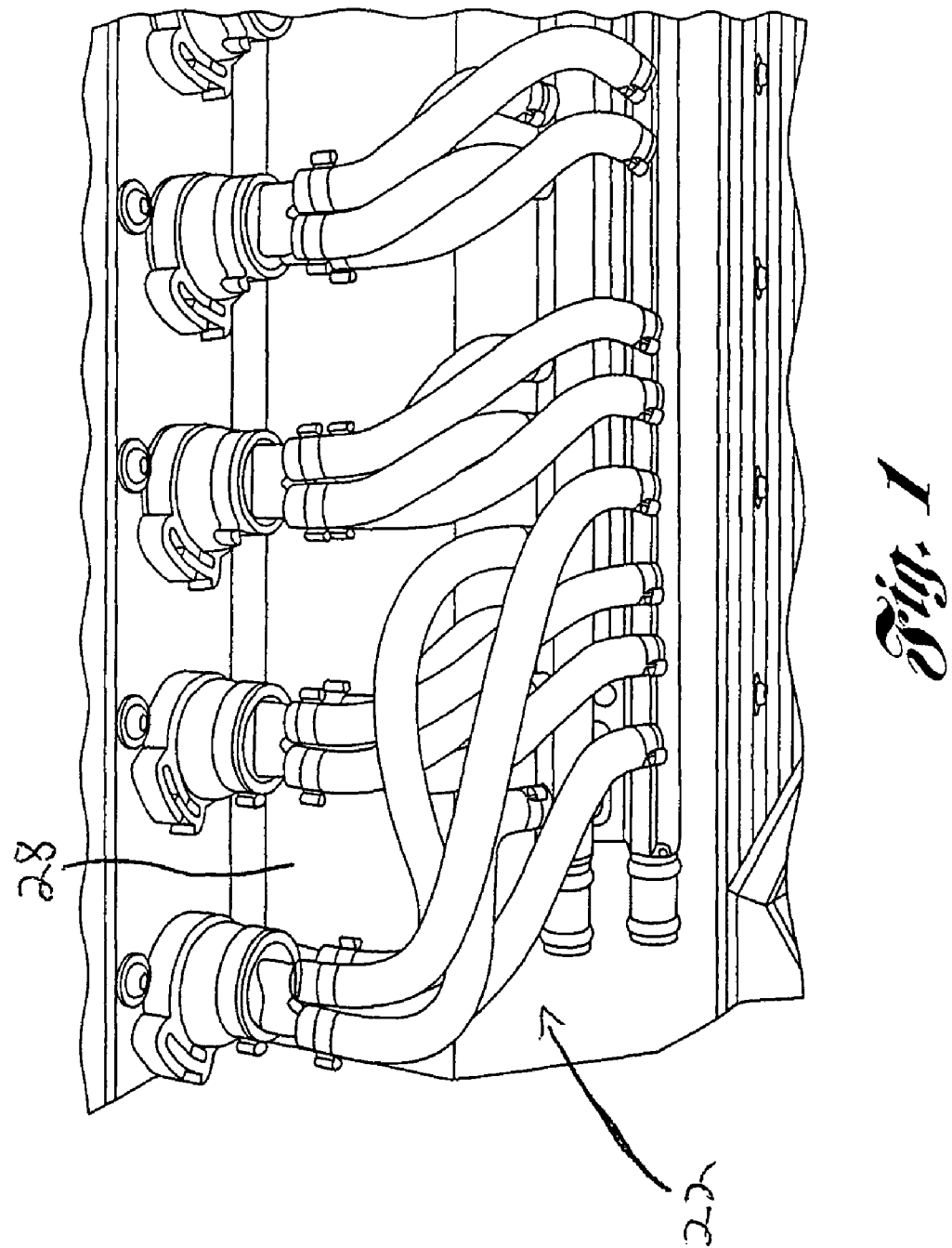
FIG. 1 shows an energy storage system according to the present invention.

Referring to the drawings, a thermal event early detection system 20 for use with an energy storage system 22 is shown. The energy storage system or battery pack 22 is generally comprised of a predetermined number of battery modules or sheets 24, a main control logic PSB, and a twelve volt power supply. In one contemplated embodiment the energy storage system 22 will have eleven battery modules 24 which are capable of producing approximately 375 volts DC. This nominal voltage will operate an electric vehicle that will be capable of traveling many miles without recharging and is capable of delivering enough power and acceleration to compare favorably with internal combustion engines.

The present invention may use batteries 26 made of lithium ion cells, in particular one embodiment used as commodity 18650 form factor lithium ion cells 26 for the electric vehicle. The batteries 26 of the present invention store the chemical energy equivalent of approximately two gallons of gasoline. The battery pack 22 operates at a nominal 375 volts and delivers approximately 240 horsepower to the motor. The energy and power capabilities of the battery pack 22 allow for the battery pack design and architecture to have many features that ensure the safety of the vehicle and its occupants during use of the electric vehicle. It should be noted that the lithium ion cells 26 are rechargeable such that after recharging, the batteries will be able to provide traction power for the vehicle based on a fully recharged and capable battery. The energy storage system 22 in one embodiment comprises 6831 individual lithium ion cells 26 that may allow it to achieve the drive power and range necessary for the vehicle. These cells 26 are electrically connected in parallel groups of six or nine cells wherein each of these groups of six or nine cells constitutes an electric module called a brick.

The bricks are then connected in series within individual battery modules 24 in the energy storage system 22 called sheets. Each sheet or battery module 24 is a single mechanical assembly and consists of nine bricks electrically connected in series. It should be noted that it is contemplated that the battery modules 24 will be the smallest replacement unit within the energy storage system 22. Each battery module 24 generally has a nominal voltage of approximately thirty five volts DC. Furthermore, each of these battery modules 24 contains a mechanical mounting system, battery monitoring hardware electronics, a thermal management or cooling system, and an optical pyrometer 30 according to the present invention as well as various safety systems to ensure proper protection of the vehicle and occupants in such vehicle. Each of these battery modules 24 will be rigidly mounted within an ESS enclosure 28 and electrically connected to one another in series. It should be noted that the ESS 22 contemplated and shown in the present invention may be adjusted by either increasing or decreasing the number of battery modules 24 within the ESS 22.

Due to the high power output of the energy storage system individual cells 26 the ESS 22 must be thermally managed. The individual cells 26 are arranged in predetermined patterns that can have any known pattern within the battery module 24. The thermal management of these cells 26 may increase and maximize the longevity of the energy storage system 22. In the present invention the temperature of the cells 26 may be managed at the battery module level wherein each of the cells 26 may benefit equally from the thermal management system regardless of its physical position within the battery module 26. It should be noted that the thermal management system of the present invention includes early detection and mitigation of thermal events for any one individual cell 26 within the battery module 24. Hence, the earlier possible detection of a cell 26 that is overheating occurs the earlier a control system 32 can initiate a cooling system 34 to provide for maximum full active cooling of the battery module 24 and associated cell 26 or the reduction of power demand via reducing current demand of cells 26 surrounding the cell 26 beginning to overheat during a thermal event. This early intervention, via early detection, will allow for the battery cell 26 to stop, reduce or control its overheating and thus limit the ability of thermal runaway to propagate throughout the entire battery module 24 which may result in the forced shutdown of the entire electrical system of the vehicle, battery module 24 and hence, affect the ability of the electric vehicle to operate and safely protect passengers.

It should be noted that internal and external factors may lead to the overheating of a battery cell 26 within a battery module 24. Generally, if a battery cell 26 reaches a sufficiently high temperature self heating may begin within that cell 26 which may eventually lead to a crossing of a critical threshold where all stored energy from that cell 26 is released as heat, thus affecting the surrounding cells with the excess heat delivered from that overheating cell 26. Therefore, early detection of such thermal events may help prevent this condition from propagating to adjacent cells 26 in a battery module 24 via the early initiation of mitigation processes or methodologies that may include but are not limited to maximum active cooling of the affective cell 26 and/or battery module 24 or the reducing of the power demand from the surrounding battery cells 26. The earlier these mitigation and proactive measures are implemented, the more effective they are in preventing propagation of this overheating cell 26. The present invention may add another layer of protection in addition to already used methods such as but not limited to a combustion product sensor, etc., to prevent thermal runaway of the cells 26 and possible destruction or loss of the ESS 24.

The increasing temperature of one battery cell 26 within a battery module 24 has the unintended consequence of increasing emission of infrared radiation at shorter wave lengths as a result of this temperature increase. The present invention will detect this increase in infrared radiation density within the battery module 24 using an electric signal from an optical pyrometer 30. The optical pyrometer 30 detects infrared radiation emitted from a cell and sends an electronic signal once a cell has reached a predetermined temperature. In one embodiment, the predetermined temperature is any temperature of 100° C. or greater. At this temperature the infrared radiation emitted from a hot or overheating cell 26 will be detected by the optical pyrometer 30 and such information then electronically sent to the control system 32 of the electrical vehicle. Generally, the inside of the battery module 24 of the ESS 22 is isolated from other sources of short wave radiation and a predetermined amount of infrared optical clarity exists within the battery module 24 such that changes in infrared energy density within the module are distinctly coupled or associated with the temperature of the cells. Therefore, a single or a predetermined plurality of optical pyrometer detectors 30 may be sufficient to identify the presence of the individual hot cell 26 at any location within the battery module 24 before the overheating cell 24 may propagate to surrounding cells 26 such that venting and the generation of combustion products may occur. Once venting and generation of combustion products occurs it may be too late to mitigate and stop the propagation of the thermal runaway from affecting all cells 26 within the battery module 24. Hence, upon immediate identification of the overheating cell 26 mitigation measures will be implemented in the present invention.

The present invention includes a plurality of cells 26 closely packed within a battery module 24 which requires as one of its predetermined key safety features that a significant portion of the energy therein does not get released as thermal energy in one catastrophic thermal event. Hence, the ability to mitigate or stop one cell 26 from releasing its energy if it becomes too hot is necessary so as to prevent other nearby cells 26 from also becoming too hot and releasing all of their energy in a propagating cascade. It should be noted that a propagating thermal energy release may be triggered by a cell 26 reaching a critical threshold temperature. The maintenance of a sub critical temperature in the surrounding cells 26 during the thermal event of the one overheating cell 26 may prevent an isolated thermal energy event from becoming a catastrophic event. Hence, the thermal energy from one cell 26 undergoing thermal runaway may be transferred to enough of the surrounding plurality of cells 26 to only increase their temperature slightly such that the thermal energy may be removed through full active cooling of the battery module 24 via a cooling system 34 arranged therein. These mitigation measures of switching on active cooling to its full power or decreasing the power demand/current demand from surrounding cells 26 may be used when such a thermal event is detected. The earlier the detection of any thermal event the more effective these mitigation measures will be.

Many thermal runaway events are now detected in prior art battery systems via the use of a combustion products detector. Generally, combustion products are produced when an individual cells reaches many hundreds of degrees Celsius and generally takes many tens of seconds or more to detect such a combustion product event. However, the present invention via the use of an optical detection system 20 may be capable of detecting a thermal runaway event almost instantaneously and at relatively moderate temperatures before the more noticeable consequences of a runaway thermal event occur, such as combustion products being released and detected. The present invention's early detection of such thermal runaway of an individual cell 26 may provide the best chance of preventing thermal runaway propagation to multiple cells 26 within the battery module 24.

The present invention uses the well known fact that objects emit radiation depending on their temperature and the emissivity of their surfaces. This thermal radiation is emitted from a surface in a broad distribution generally described by Plank's formula for blackbody radiation. Radiation from these objects at different temperatures generally have profiles that are similar in shape but different magnitude and location on the frequency spectrum. Generally, warmer objects will emit more radiation and that radiation is at shorter wave lengths than cooler objects of the same type. Hence, the difference in both radiation quantity and the radiation wave length between an array of battery cells 26 at a predetermined normal temperature and a single cell 26 at a predetermined overheating or hot temperature is generally sufficient enough and significant enough to detect such overheating cell 26 at any position within a module. It should be noted that generally the normal temperature of the array of battery cells 26 within a battery module 24 of an electric vehicle of the present invention is less than 40° C. and that a cell 26 is considered to be overheating and nearing a hot temperature when it reaches approximately one hundred degrees Celsius or greater in temperature. However, it should be noted that depending on the design of the battery module 24 and cells 26 used therein, the normal temperature and temperature at which a thermal event appears to be beginning may vary within the range of 0° C. to 500° C.

The present invention achieves this thermal event early detection via the use of an optical pyrometer 30 arranged at a predetermined position within a battery module 24 of the ESS 22. The optical pyrometer 30 may be placed at any position within the battery module 24. The pyrometer 30 may be able to detect an increase in short wave radiation density within the module 24 wherein that short wave radiation density is associated with a single cell 26 within the battery module 24 that has become too hot and has crossed a predetermined threshold temperature. In one contemplated embodiment as described above, the threshold temperature that indicates a cell 26 is becoming too hot is approximately 100° C. However, any other temperature may be used depending on the design requirements of the battery module 24. Generally, the packaging of the battery cells 26 within the battery module 24 is such that the cells 26 have a reflective outer surface that is capable of reflecting photons off of their surfaces within the battery module 24. This cell packaging will allow reflection of nearly 95% of photons at the infrared wave length. Generally, the battery module 24 is designed such that no barriers are arranged within the battery modules 24 to the transport of this radiation within the module 24 such that the radiation spectrum at any point within the battery module 24 is capable of representing all of the components from every cell 26 within the module 24. Therefore, the optical pyrometer detector 30 or any other known detector may be placed anywhere within the module 24 and still be capable of determining that one individual cell 26 within the battery module 24 is overheating based on detection of the short wave radiation density within that module 24. It should be noted that in the embodiment shown, an optical pyrometer 30 is used to detect the short wave radiation density. However, any other detector capable of detecting any photon or radiation at generally infrared wave lengths may be used in the present invention. Also, it should be noted that if any one of the cells 26 becomes much hotter than the rest of the cells 26 within the battery module 24, the magnitude and wave length of the admitted energy from this cell 26 will change such that the differences in the spectral energy density due to this overheating event of this one cell 26 may be detectable at any location within the module 24 by one detector 30, however a plurality of detectors is also contemplated to be used in the invention to allow for earlier detection of such thermal events and/or corroboration of such thermal events occurring on an individual cell 20 via a plurality of detectors being controlled by a control system 32 of the electrical vehicle.

The optical pyrometer 30 is capable of being arranged anywhere within the battery module 24 and may be tuned to a single frequency in one contemplated embodiment or to a predetermined band of frequencies in another contemplated embodiment. The tuning of the optical pyrometer 30 to each individual battery module 24 and the cells 26 arranged within such modules will allow for a frequency sensitivity of the pyrometer 30 to be selected for predetermined cell temperatures that are expected to occur within the battery module 24. This will allow for the pyrometer 30 to be maximally sensitive to the expected spectral energy density shift within each individual battery module 24 due to one cell 26 becoming hot within that individual battery module 24. Therefore, if eleven battery modules 24 are required in an ESS 22, such as that for one contemplated embodiment in the present invention, each optical pyrometer 30 may be tuned to a specific frequency wherein that frequency is different for each of the individual eleven battery modules 24 within the ESS 22. However, it is also contemplated that each of the battery modules 24 may have the optical pyrometer 30 tuned to detect the same frequency across all battery modules 24 depending on the design requirements, specs, and tolerances of the battery cells 26 used in the electric vehicle. Generally, the frequencies that are chosen to be monitored by the optical pyrometer 30 are determined by using the Plank's blackbody emission spectrum for each cell 26 and modeling the dispersion of such radiation from each cell 26 throughout the battery module 24. Generally, an optical frequency may be chosen by examining the change in radiation energy density at the location of the pyrometer 30 within the battery module 24 and the sensitivity of the optical pyrometer 30 to the radiation energy density. The shorter wave lengths generally provide a larger differential signal between the radiation admitted by a hot cell 26 within a battery module 24 and the surrounding cells 26 within that same module 24. The shorter wave lengths also result in lower overall radiation energy densities at their frequency being monitored.

The present invention may use an electronic signal from the optical pyrometer 30 to monitor the radiation energy density over the predetermined and chosen range of frequencies or frequency. This electronic signal will provide for an electronic communication between the optical pyrometer 30 and the control system 32 of the electric vehicle. It should be noted that the electric signal may be transferred over a wireless network or a wired network depending on the design requirements and environment in which the electric vehicle and battery module 24 will be used. It should be noted that upon detection of short wave radiation at a density above a predetermined threshold which in one embodiment as described above results from at least one cell 26 within a module having a temperature at or above 100° C. the electronic optical pyrometer 30 will send an electronic signal to the control system 32 monitoring the pyrometer 30. This control system 32 upon receiving such a signal detection of short wave radiation at a predetermined density will then initiate mitigation processes or methodologies to stop and/or control the overheating of that individual cell 26. In one contemplated embodiment, such a mitigation process may involve full active cooling of that one individual cell 26, the entire battery module 24, or surrounding cells around the overheating cell 26 to allow for the surrounding cells to absorb such excess heat without entering thermal runaway. Another contemplated embodiment will use a mitigation process that reduces the current demand from the surrounding cells thus reducing the overall heat of the cells 26 surrounding the cell 26 having a thermal event thus allowing for the surrounding cells to absorb any excess heat without entering thermal runaway and propagating a thermal runaway event within the battery module 24. It should be noted that any other known mitigation process or methodology that is capable of isolating the overheating cell or reducing the temperature of the overheating cell without leading to thermal propagation into surrounding cells and complete thermal runaway of the entire module is also capable of being used in conjunction with the early detection system 20 of the present invention.

The thermal event early detection system 20 of the present invention also may use in one contemplated embodiment a reflective surface 38 arranged within the module 24 at a predetermined position. The arrangement of this reflective surface or surfaces 38 within the module 24 may allow for a decrease in the absorption and transmission of infrared radiation at or through the outer walls of the battery module 24. Furthermore, the use of a single or plurality of reflective surfaces 38 may also be used to direct the flow of the infrared radiation within the battery module 24 to a predetermined position thus decreasing in the detection time of a overheating cell 20 by the optical pyrometer 30 within the battery module 24. Generally, if each of the battery cells 26 within the battery module 24 is capable of being seen or detected by the optical pyrometer detector via a predetermined small number of reflections off of the reflective surfaces 38 the required sensitivity of the optical pyrometer detector 30 may be greatly reduced, thus reducing the cost and time for detection of such thermal runaway event thus increasing the chances that the thermal runaway event will not propagate into the surrounding cells 26. Reflective surfaces 38 may also serve to reduce the quantity of optical pyrometer detectors 30 required. The increased durability and longevity of the cells 26 within the ESS 22 may increase the value of the electric vehicle to the consuming public. Furthermore, the reduction of excess thermal heat within a battery cell 26 may increase the efficiency of the battery cells 26 and overall battery modules 24 thus increasing the amount of power capable of being provided by the battery modules 24 to the electric vehicle thus increasing the range of the electric vehicle for the consuming public. It should be noted that the use of the reflective surfaces 38 inside of the battery module 24, wherein that battery module 24 generally is sealed from outside light, allows the infrared radiation to scatter inside of the module 24 and be detectable above a certain density of short wave radiation. Generally, in one contemplated embodiment, the photon transistor in the form of the optical pyrometer 30 may be sensitive at 1000 to 4000 nanometers which, for a Plank distribution, is shorter wavelength than a 50° C. peak but within a 100° C. curve. In one embodiment, the pyrometer 30 may be lead sulfide or lead selenide however any other known type of optical pyrometer 30 may also be used. This will allow for a cell that reaches the threshold temperature of approximately 100° C. to be detected by a single photo detector 30 within a module of generally 50° C. cells 26 therein. It should be noted that the present invention has been described for use in an electric vehicle, however it may be used in any other type of electrical system that uses a battery pack or energy storage system to provide power to any known vehicle, industrial machine, or any other system using electricity in operation thereof.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A battery module for use in an electric vehicle, said battery module including:
   a plurality of cells arranged in a predetermined pattern within the battery module;
   means for optically monitoring emissions within said battery module and within a predetermined wavelength band, wherein said means for optically monitoring emissions outputs a first signal when said emissions within said battery module and within said predetermined wavelength band exceed a predetermined threshold;
   a cooling system thermally coupled to said battery module, wherein said cooling system is configured to actively cool said battery module; and
   a control system coupled to said means for optically monitoring emissions and coupled to said cooling system, wherein said control system activates said cooling system upon receipt of said first signal from said means for optically monitoring emissions.

2. The battery module of claim 1 wherein said plurality of cells further comprise reflective outer surfaces configured to reflect approximately 95% of photons within said predetermined wavelength band.

3. The battery module of claim 1 wherein said means for optically monitoring emissions further comprises an optical pyrometer.

4. The battery module of claim 1 wherein said predetermined threshold corresponds to a cell temperature of is approximately 100° C.

5. The battery module of claim 1 wherein said control system reduces current demand from at least a portion of said plurality of cells within the battery module upon receipt of said first signal from said means for optically monitoring emissions.

6. The battery module of claim 1 wherein said means for optically monitoring emissions further comprises a plurality of optical pyrometers arranged within the battery module.

7. The battery module of claim 1 further comprising a plurality of reflective surfaces arranged within said battery module, wherein said plurality of reflective surfaces reflect photons within said predetermined wavelength band.

8. The battery module of claim 7 wherein said plurality of reflective surfaces exhibit lower radiation absorption and transmission within said predetermined wavelength band than a plurality of inner battery module surfaces.

9. The battery module of claim 7 wherein said plurality of reflective surfaces direct photons within said predetermined wavelength band toward said means for optically monitoring emissions.

10. A method of detecting a battery cell thermal event within a battery module of an electric vehicle, said method including the steps:
    monitoring optical emissions within said battery module and within a predetermined wavelength band;
    comparing optical emissions monitored within said battery module and within said predetermined wavelength band to a predetermined threshold;
    outputting a first signal when said optical emissions monitored within said battery module and within said predetermined wavelength band exceed said predetermined threshold;
    transmitting said first signal to a control system; and
    activating a cooling system thermally coupled to said battery module when said control system receives said first signal.

11. The method of claim 10 wherein said predetermined threshold corresponds to a cell temperature of approximately 100° C.

12. The method of claim 10 further comprising the step of arranging a plurality of reflective surfaces within said battery module to decrease losses via absorption and transmission of radiation within said predetermined wavelength band through at least one wall of the battery module.

13. The method of claim 10 further comprising the step of reducing current demand from a plurality of battery cells within said battery module when said control system receives said first signal.

* * * * *